United States Patent
Cabos et al.

(10) Patent No.: US 12,399,073 B2
(45) Date of Patent: Aug. 26, 2025

(54) SYSTEM AND METHOD TO DETERMINE ENGINE THRUST OF A TAXIING AIRCRAFT

(71) Applicant: The Boeing Company, Arlington, VA (US)

(72) Inventors: Ralf Rene Cabos, Hainburg (DE); Spyridon Sakkas, Roedermark (DE)

(73) Assignee: THE BOEING COMPANY, Arlington, VA (US)

(*) Notice: Subject to any disclaimer, the term of this patent is extended or adjusted under 35 U.S.C. 154(b) by 261 days.

(21) Appl. No.: 18/158,609

(22) Filed: Jan. 24, 2023

(65) Prior Publication Data
US 2023/0258687 A1 Aug. 17, 2023

(30) Foreign Application Priority Data
Feb. 16, 2022 (EP) ................................ 22386007

(51) Int. Cl.
| | | |
|---|---|---|
| G01P 15/16 | (2013.01) | |
| B64D 31/00 | (2024.01) | |
| B64D 45/00 | (2006.01) | |
| B64F 5/60 | (2017.01) | |
| G01L 5/13 | (2006.01) | |
| G08G 5/22 | (2025.01) | |
| G08G 5/26 | (2025.01) | |
| G08G 5/51 | (2025.01) | |
| G08G 5/72 | (2025.01) | |

(52) U.S. Cl.
CPC .............. *G01P 15/16* (2013.01); *B64D 45/00* (2013.01); *B64F 5/60* (2017.01); *G01L 5/13* (2013.01); *G08G 5/22* (2025.01); *G08G 5/26* (2025.01); *G08G 5/51* (2025.01); *G08G 5/727* (2025.01); *B64D 31/00* (2013.01)

(58) Field of Classification Search
CPC ....... G01P 15/16; B64D 45/00; G08G 5/0013; G08G 5/0026; G08G 5/0082; G08G 5/065; B64F 5/60; G01L 5/13
See application file for complete search history.

(56) References Cited

U.S. PATENT DOCUMENTS

| | | |
|---|---|---|
| 4,843,554 A | 6/1989 | Middleton et al. |
| 4,980,833 A | 12/1990 | Milligan et al. |
| (Continued) | | |

FOREIGN PATENT DOCUMENTS

| | | |
|---|---|---|
| EP | 2930341 A1 | 10/2015 |
| EP | 3572332 A1 | 11/2019 |
| (Continued) | | |

*Primary Examiner* — Helen C Kwok
(74) *Attorney, Agent, or Firm* — COATS & BENNETT, PLLC (57) ABSTRACT

A computing device to determine engine thrust of an aircraft during taxiing. The computing device includes memory circuitry configured to store computer-readable program code. Processing circuitry is configured to execute the computer-readable program code to cause the computing device to: identify an aircraft on an airport surface; calculate an acceleration of the aircraft during the taxiing of the aircraft; compare the acceleration with predetermined data from similar aircraft; and based on the comparison, determine an engine thrust for the aircraft while the aircraft is taxiing.

20 Claims, 10 Drawing Sheets

(56) References Cited

U.S. PATENT DOCUMENTS

| | | | |
|---|---|---|---|
| 10,417,919 B1* | 9/2019 | Jayathirtha | G08G 5/025 |
| 2005/0234609 A1* | 10/2005 | Villaume | G05D 1/0083 |
| | | | 701/3 |
| 2009/0112535 A1* | 4/2009 | Phillips | G06Q 10/04 |
| | | | 703/2 |
| 2011/0202205 A1* | 8/2011 | Pepitone | B64D 31/00 |
| | | | 701/3 |
| 2013/0131888 A1* | 5/2013 | Nutaro | G08G 5/0091 |
| | | | 701/1 |
| 2014/0114557 A1* | 4/2014 | Nutaro | G05D 1/0083 |
| | | | 701/120 |
| 2014/0156160 A1* | 6/2014 | DeVlieg | B60T 8/00 |
| | | | 701/70 |
| 2019/0079846 A1 | 3/2019 | Shaik et al. | |
| 2019/0354644 A1* | 11/2019 | Orhan | G06N 3/044 |
| 2020/0327587 A1* | 10/2020 | Cabos | G08G 5/065 |
| 2021/0049919 A1* | 2/2021 | Davis | B64F 5/40 |
| 2021/0366297 A1 | 11/2021 | Peukert et al. | |

FOREIGN PATENT DOCUMENTS

| | | |
|---|---|---|
| WO | 2013091057 A1 | 6/2013 |
| WO | 2019002925 A1 | 1/2019 |

* cited by examiner

SYSTEM AND METHOD TO DETERMINE ENGINE THRUST OF A TAXIING AIRCRAFT

RELATED APPLICATIONS

This claims priority to European Patent Application No. EP 22386007.3, filed Feb. 16, 2022, the disclosure of which is incorporated herein by reference in its entirety.

TECHNOLOGICAL FIELD

The present disclosure relates generally to monitoring aircraft on an airport surface and, more particularly, to determining an engine thrust of an aircraft that is moving taxiing on an airport surface.

BACKGROUND

Aircraft taxi on airport surfaces using engine thrust created by the engines. The engines of the aircraft can be set to different thrust levels to provide different engine thrust to the aircraft. In one example, the engines can be set to one of a first thrust level or a second reduced thrust level. The first thrust level provides for a higher acceleration and velocity during taxiing. The second thrust level is a reduced thrust level that results in slower acceleration and velocity. The reduced thrust level of each engine can vary with one setting including a zero thrust level in which the engine produces no force to move the aircraft. For aircraft operating with one or more of the engines at a zero thrust level, the overall engine thrust of the aircraft is provided by one or more of the other engines operating at a non-zero thrust level.

Pilots taxi with the engines at different thrust levels for a variety of reasons. A higher engine thrust provides for higher acceleration and velocity which can lessen commute times between the gate and the runway or vice versa. Lower thrust levels may conserve fuel and may also result in lower emissions.

There are advantages in knowing the thrust level of a taxiing aircraft. As stated above, these levels can be used to more accurately determine fuel usage and/or emissions. Knowing the thrust level of an aircraft can also facilitate scheduling at an airport. An air traffic controller responsible for coordinating multiple aircraft at an airport would be better able to efficiently schedule aircraft at the airport if they knew the thrust levels and thus the acceleration and velocity of the aircraft. A gate operator responsible for preparing the gate for an incoming flight would be better able to make certain the gate was prepared on time if they more precisely knew the expected arrival at the gate.

Pilots are not required to report the thrust levels used during taxiing and there is not a system or manner of determining the engine thrust of an aircraft. Thus, there is a need to determine the engine thrust of an aircraft that is taxiing on an airport surface.

SUMMARY

One example is directed to a computing device to determine engine thrust of an aircraft during taxiing. The computing device comprises memory circuitry configured to store computer-readable program code. Processing circuitry is configured to execute the computer-readable program code to cause the computing device to: identify an aircraft on an airport surface; calculate an acceleration of the aircraft during the taxiing of the aircraft; compare the acceleration with predetermined data from similar aircraft; and based on the comparison, determine an engine thrust for the aircraft while the aircraft is taxiing.

Comparing the acceleration with the predetermined data from similar aircraft may comprise comparing the acceleration and the time period with acceleration data and time period data for other aircraft each with a common manufacturer and model.

The processing circuitry may be further configured to determine the number of engines on the aircraft based on identified model of the aircraft.

For each of the engines the processing circuitry may be configured to determine whether each of the engines is operating at a higher thrust level or a lower thrust level.

The lower thrust level may be a zero thrust level.

The processing circuitry may be configured to: determine a starting point of the aircraft on the airport surface when the aircraft is stationary; determine an ending point that is positioned away from the starting point with the aircraft moving along the airport surface at the ending point; and calculate the acceleration based on a change in velocity between the starting and ending points and the time period for the aircraft to move between the starting and ending points.

The processing circuitry may be configured to determine that the acceleration falls within a cluster of data points in the predetermined data and determine the engine thrust based on the cluster.

The processing circuitry may be configured to determine a number of the engines and a thrust level of each of the engines.

The predetermined data may be stored at the monitoring node.

One example is directed to a computing device to determine engine thrust of an aircraft during taxiing. The computing device comprises memory circuitry configured to store computer-readable program code. Processing circuitry is configured to execute the computer-readable program code to cause the computing device to: identify the aircraft by model; identify a direction of travel of the aircraft; determine an acceleration of the aircraft over a time period during taxiing of the aircraft; compare the acceleration and the time period with predetermined data of other aircraft of the same model and the same direction of travel; determine that the acceleration and time period is within a cluster of data points in the predetermined data with the cluster corresponding to an engine thrust for the aircraft; and determine that the aircraft is taxiing with a same number of engines that are operating at same thrust levels as other aircraft from the corresponding cluster.

The processing circuitry may determine an engine thrust of the aircraft.

The processing circuitry may calculate the acceleration between a first point where the aircraft is stationary and a second point where the aircraft is moving.

The processing circuitry may calculate the acceleration during the time period with a velocity of the aircraft constantly increasing.

The computing device may be further configured to calculate the acceleration and the time period of the acceleration of the other aircraft and store the thrust levels as the data points in the predetermined data.

One example is directed to a method of calculating engine thrust of an aircraft that is taxiing along an airport surface of an airport. The method comprises: identifying an aircraft that is on an airport surface; calculating an acceleration over a period of time of the aircraft taxiing along the airport surface; comparing the acceleration and the time period to data points from other ones of the same aircraft that each had an acceleration over a time period during taxiing; determining that the acceleration and the time period corresponds to a cluster of the data points with the cluster corresponding to a number of engines operating at one or more thrust levels; and determining that the aircraft is taxiing with the same number of engines and the same thrust levels as the cluster.

Identifying the aircraft may comprise identifying a model of the aircraft from records maintained at the airport.

Calculating the acceleration of the aircraft may comprise determining a change in velocity of the aircraft between first and second points along the airport surface relative to the time period for the aircraft to move between the first and second points with the velocity of the aircraft at the first point being zero.

The method may further comprise obtaining the data points from one or more remote entities that monitor other aircraft.

The method may further comprise that each of the one or more engines on the aircraft has a full thrust level or a zero thrust level.

The method may further comprise obtaining the data points from previous aircraft while taxiing at the airport.

The features, functions and advantages that have been discussed can be achieved independently in various examples or may be combined in yet other examples, further details of which can be seen with reference to the following description and the drawings.

DETAILED DESCRIPTION

Figure 1:
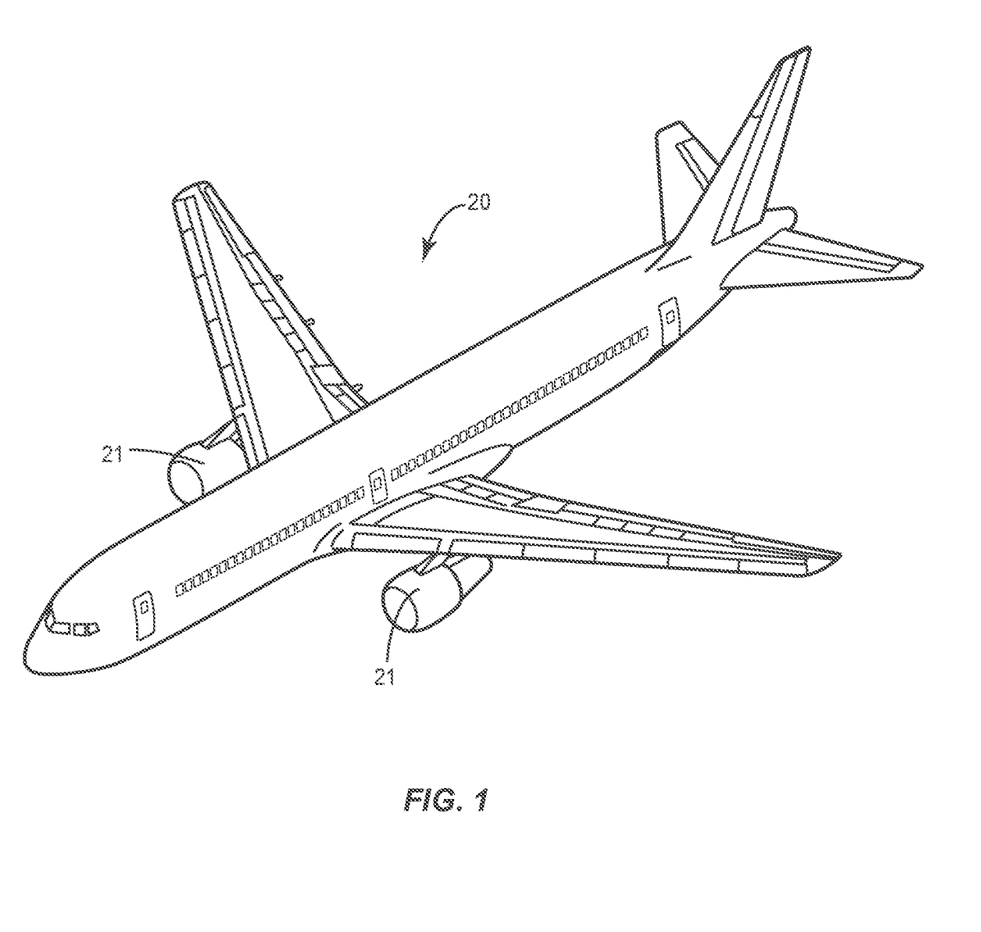
FIG. 1 is a perspective view of an aircraft.

FIG. 1 illustrates an example of an aircraft 20 that includes engines 21. The aircraft 20 can include different numbers of engines 21, with FIG. 1 including an example with two engines 21. The engines 21 are configured to provide thrust to propel the aircraft 20 during flight, as well as propel the aircraft during taxiing on an airport surface prior to and after the flight. Various types of engines 21 can be used on the aircraft 20, including but not limited to turboprop engines, turbojet engines, turboshaft engines, turbofan engines, and ramjet engines. The aircraft 20 can be configured to transport various cargo, such as passengers and/or and freight. The aircraft 20 further includes landing gear 22 (see FIG. 3) that includes tires for movement on the airport surface. The landing gear 22 is deployed while the aircraft 20 is on the ground and can be retracted during flight.

Figure 2:
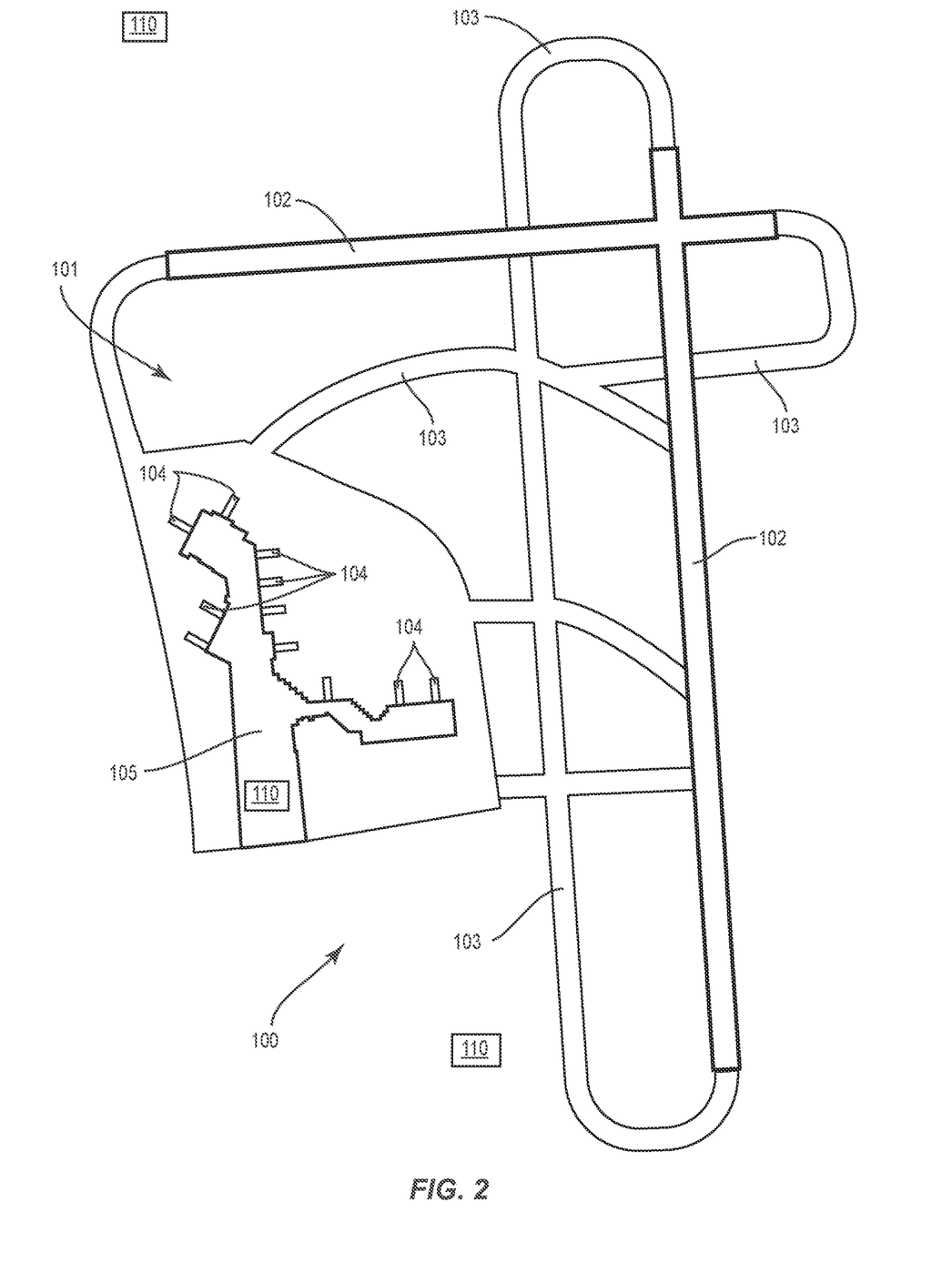
FIG. 2 is a schematic diagram of an airport.

FIG. 2 illustrates an airport 100 from which the aircraft 20 can takeoff and land. The airport 100 includes airport surfaces 101 along which the aircraft 20 moves while on the ground. The airport surfaces 101 can include but are not limited to runways 102 and taxiways 103. The taxiways 103 extend between the runways 102 and the gates 104 at the terminal 105.

The aircraft 20 taxis along the airport surfaces 101 when on the ground. In some examples, the taxiing includes moving along the taxiways 103 between the gates 104 and the runways 102. The taxiing can also occur along the runways 102, such as moving along a section of the runway 102 after a landing is completed or when crossing one runway intersection in order to reach another runway 102. In some examples, the aircraft 20 lands on a runway 102 and completes the landing while still along a central section of the runway 102. The taxiing includes moving along the remainder of the runway 102 and then along a taxiway 103.

The aircraft 20 is propelled along the ground during taxiing by the one or more of the engines 21. The acceleration and velocity of the aircraft 20 during taxiing depends upon the overall engine thrust provided by the one or more engines 21. An aircraft 20 with a higher overall engine thrust moves at a higher acceleration and velocity than a corresponding aircraft 20 with a lower overall engine thrust.

In some examples, each of the engines 21 operates at one of two thrust levels. The thrust levels include a first higher level and a second lower level. In some examples, the thrust levels include a full thrust level and a zero-thrust level. The lower thrust level can be used to conserve fuel and can further provide environmental benefits by lessening the amount of exhaust produced by the engine 21. In other examples, the lower thrust level is above zero and provides for propelling the aircraft 20 at a slower rate. In other examples, the engines 21 operate at one or more intermediate thrust levels in addition to the high and low thrust levels. In other examples, the high thrust level is less than a full thrust level for the engine 21.

A monitoring node 110 monitors the aircraft 20 during taxiing to determine the thrust levels of the one or more engines 21 and thus the overall engine thrust of the aircraft 20. The monitoring node 110 can be associated with various entities 80. Some examples includes the airport 100, such as through a control tower that monitors the overall operation of the airport 100. Other examples include an airline that schedules the arrival and departure of aircraft 20. Other examples include a flight tracker (e.g., Flight Radar 24, Flight Aware, Spire) that monitors the status of flights. Other examples include a governmental unit (e.g., Federal Aviation Administration (FAA)) that regulates various aspects of aviation. In other examples, the monitoring node 110 is independent and is not associated with any other entity 80.

Figure 3:
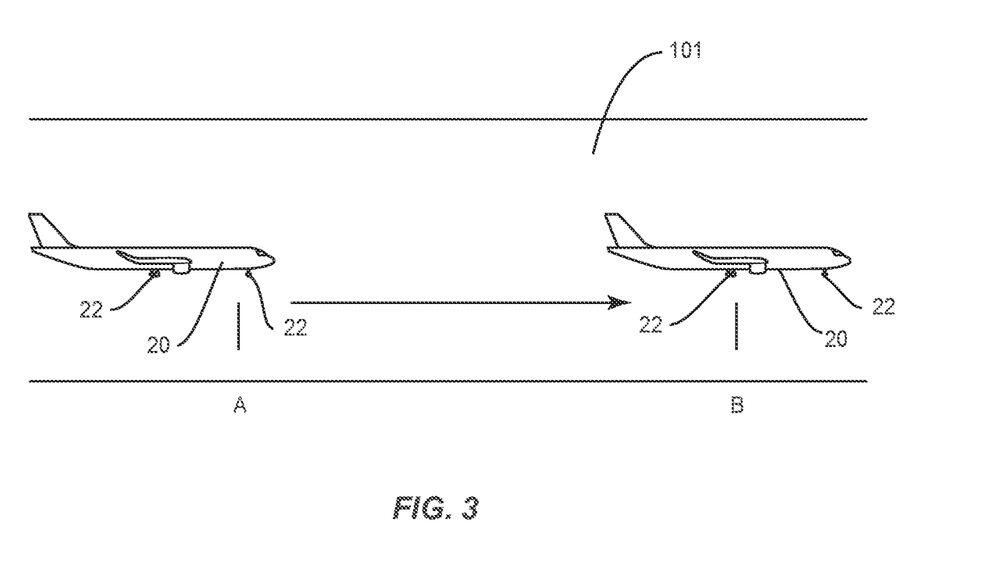
FIG. 3 is a schematic diagram of an aircraft that moves along an airport surface between first and second positions.

The monitoring node 110 calculates the thrust levels of the engines 21 of an aircraft 20 using the acceleration of the aircraft 20 moving along the airport surface 101 and the amount of time of the acceleration. This is schematically illustrated in FIG. 3 with the monitoring node 110 monitoring the movement of the aircraft 20 along the airport surface 101 from a first point A to a second point B. The acceleration of the aircraft 20 is calculated for the section of the airport surface 101 between the points A, B based on the following formula:

$$\text{acceleration} = \Delta \text{velocity} / \Delta \text{time} \qquad \text{Eq. 1}$$

For example, the aircraft 20 is monitored moving at a velocity of 10 m/s at point A and a velocity of 25 m/s at point B. The aircraft 20 covers the distance between points A and B in 2 seconds. The acceleration is 7.5 m/s$^2$. In one example, the acceleration calculation occurs from a point on the airport surface 101 where the aircraft is stationary (i.e., point A has a velocity=0). For example, from a point on the taxiway 103 where the aircraft 20 paused after completing a landing, with the taxiing calculation occurring once the aircraft 20 begins to move again along the runway 102.

In some examples, the acceleration of the aircraft 20 is calculated over a distance in which the velocity of the aircraft 20 is changing. For example, the velocity of the aircraft 20 is increasing between points A and B. Distances in which the aircraft 20 has a constant or substantially constant velocity are not used for the acceleration calculation. For example, an aircraft 20 is monitored moving along an airport surface 101. For a first section between points A and B, the aircraft 20 accelerates. For a second section between points B and C, the aircraft 20 has a constant or substantially constant velocity with no additional acceleration. The acceleration of the aircraft 20 is determined using the data between points A and B, with the movement between points B and C not included in the calculations.

In addition to calculating the acceleration, the monitoring node 110 identifies the aircraft 20. This can include identifying one or more of the manufacturer of the aircraft 20, the model, and one or more variants (e.g., Boeing 747-8, Boeing 737 MAX, Boeing 787, Boeing 777-X). Identification of aircraft provides for determining the number of engines 21 on the aircraft 20. The identification also provides for comparing the aircraft 20 with data from other similar aircraft 20 to determine the engine thrust as will be explained below.

The monitoring node 110 also determines whether the aircraft 20 is taxiing outward in preparation for takeoff or taxiing inward after landing. The direction of taxiing can affect the acceleration because of the amount of fuel on the aircraft and resultant mass. In some examples, the aircraft 20 has a lower acceleration during taxiing outward because of the larger fuel load then a comparable aircraft 20 that is taxiing inward that has less fuel due to fuel usage during the flight.

The monitoring node 110 determines the engine thrust of the aircraft 20 by comparing the acceleration data with other similar taxiing aircraft 20. In some examples, the comparison uses other aircraft 20 of the same manufacturer and model and that were taxiing the same direction. Other examples include other similar aircraft 20 of the same make and model regardless of direction. Other example include other aircraft 20 with the same number of engines 21.

Figure 4A:
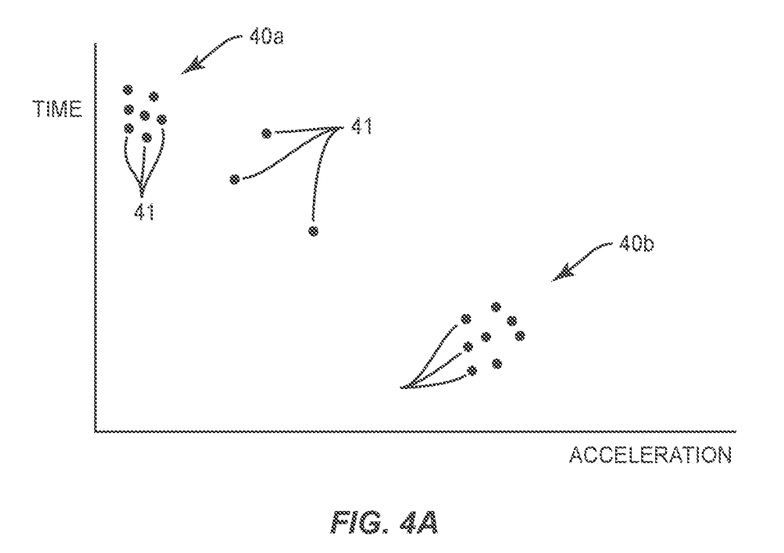
FIG. 4A is a time and acceleration chart of data points of predetermined data for aircraft that include two engines.

FIG. 4A illustrates predetermined data used by the monitoring node 110 to compare with the current aircraft 20. The predetermined data are from other aircraft 20 that have been observed taxiing on the airport surface. The predetermined data are for aircraft 20 with one or more of the same characteristics as the monitored aircraft 20. For example, the predetermined data are from numerous other aircraft 20 of the same make and model that were moving in the same direction.

As illustrated in FIG. 4A, the predetermined data includes a number of data points 41 that each represent taxiing data for a previously recorded aircraft 20. Each data point 41 can be plotted on a time-acceleration graph. The data points 41 group into one or more clusters 40 that correspond to the number of engines 21 on the aircraft 20. For example, FIG. 4A includes two clusters 40a, 40b as the data are for an aircraft 20 having two engines 21. Other examples include three clusters 40 for aircraft 20 with three engines 21, four clusters 40 for four engines 21, etc.

The monitoring node 110 compares the acceleration data from the current aircraft 20 with the predetermined data and determines whether the monitored aircraft 20 falls into one of the clusters 40. Using the example of FIG. 4A as an example, the monitoring node 110 determines whether data point of the monitored aircraft 20 falls into either of clusters 40a or 40b. A data point 41 that falls into the first cluster 40a includes a lower acceleration and a higher time. This cluster 40a corresponds to aircraft 20 that were taxiing with one engine 21 operating at a first thrust level (e.g., a high thrust level) and a second engine operating at a second thrust level (e.g., a low thrust level). If the monitoring node 110 determines the data point 41 falls into this cluster 40a, the monitoring node 110 determines that the monitored aircraft 20 is operating in a similar manner with the engines 21 at the same thrust levels. If the monitoring node 110 determines that the data point 41 falls into the second cluster 40b that corresponds to aircraft 20 that operated with both of the engines 21 at a high thrust level, the monitoring node 110 determines that the monitored aircraft 20 is also operating at this same engine thrust.

The monitoring node 110 can use one or more different algorithms to place the data points 41 of the predetermined data into the one or more clusters 40. The monitoring node 110 can also use the manufacturer and model of the aircraft 20 to determine the number of engines 21 and thus the number of clusters 40 into which to segregate the data. One algorithm includes connectivity models in which the data points 41 are classified into separate clusters 40 and then aggregated as the distance between the data points 41 decreases. Connectivity models can also classify the data points 41 in a single group and then partition the group into separate clusters 40 as the distance increases. Another connectivity model algorithm utilizes iterative clustering algorithms in which the similarity between the data points 41 is based on the closeness of data points 41 to a centroid of the clusters 40. Another algorithm uses distribution models based on the probability that all data points 41 in the cluster 40 belong to the same distribution. Another algorithm uses density models that identify the data space for areas of varied density of data points 41 and isolates and assigns the different density regions into the same cluster 40.

Once the data points 41 of the predetermined data are grouped into the one or more clusters 40, the monitoring node 110 determines whether the data point 41 of the monitored aircraft 20 falls into one of the clusters 40. One clustering algorithm includes soft clustering in which the data point 41 is assigned a probability of being within the clusters 40. Another algorithm uses hard clustering in which the data point 41 is assigned to a cluster 40.

Figure 4B:
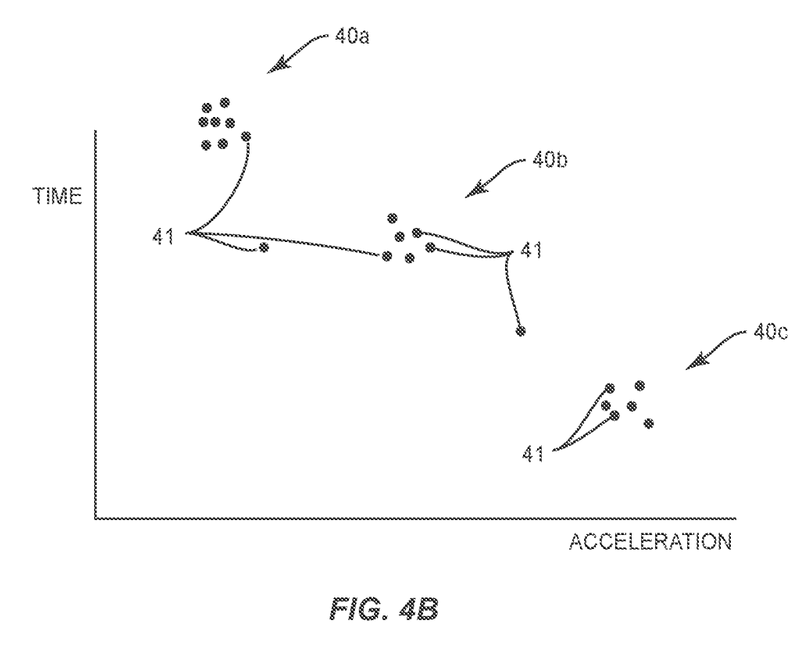
FIG. 4B is a time and acceleration chart of data points of predetermined data for aircraft that include three engines.

As previously stated, the number of clusters 40 in the predetermined data corresponds to the number of engines 21 on the aircraft 20. FIG. 4B illustrates an example of predetermined data for a three-engine aircraft 20. Data points 41 form clusters 40a, 40b, 40c. Cluster 40a indicates one engine 21 at a high thrust level and two engines 21 at a low thrust level (e.g., one engine 21 at a full thrust level or some positive thrust level and two engines at a low thrust level). Cluster 40b indicates two engines 21 at the high thrust level and one engine at the low thrust level. Cluster 40c indicates all three engines 21 at the high thrust level.

Figure 5:
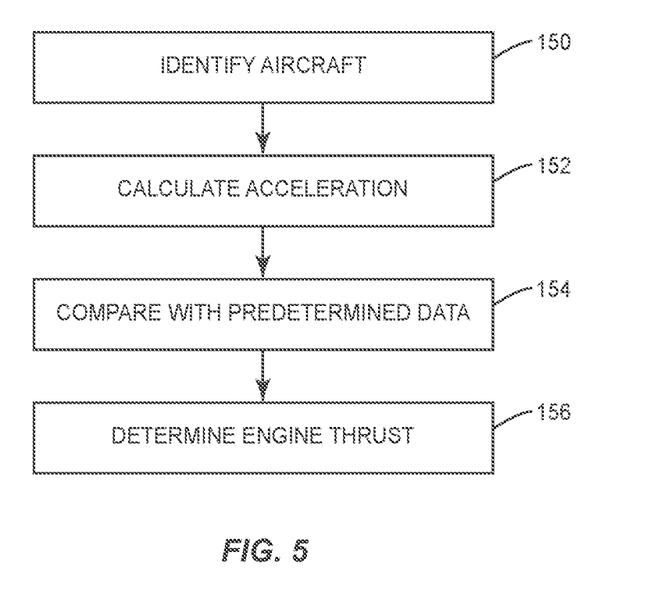
FIG. 5 is a flowchart diagram of a method of determining engine thrust of an aircraft during taxiing on an airport surface.

The monitoring node 110 determines the engine thrust of the aircraft 20 by determining the thrust level of the engines 21 based on a comparison with previous aircraft 20. FIG. 5 illustrates one method of determining the engine thrust that includes that the monitoring node 110 identifies the aircraft 20 (block 150) and calculates the acceleration of the aircraft 20 over a time period as the aircraft 20 moves along the airport surface 101 (block 152). The monitoring node 110 compares these data of the monitored aircraft 20 with predetermined data for similar aircraft 20 (block 154). Based on the comparison, the monitoring node 110 determines a thrust level for each of the engines 21 on the aircraft 20 and thus an engine thrust for the aircraft 20 (block 156).

The engines 21 of the aircraft 20 are powered to propel the aircraft 20 during taxiing along the airport surface 101. In some examples, the thrust level for each of the engines 21 includes either providing no thrust or providing a full amount of thrust. In other examples, one or more of the engines 21 can provide differing amounts of thrust between the no thrust and full thrust levels. Using the example of FIG. 4A, the data points 41 within cluster 40b include previous aircraft 20 taxiing using some amount of thrust on both engines 21. Data points 41 within the second cluster 40a include previous aircraft 20 that taxied using one engine 21 with some amount of thrust and a second engine 21 with no thrust. Data points 41 that do not fall within either cluster 40 are outlier data. These outlier data points 41 can be caused by aircraft 20 using differing amounts of thrust on one or both engines 21 (e.g., ¾ engine thrust, ½ engine thrust). The outlier data points 41 can also be a result of different fuel amounts in the aircraft 20 than normal for other similar aircraft 20 thus causing faster or slower taxiing. These outlier data points can also be caused by unusual weather conditions, such as fog, rain, and snow that require pilots to operate the aircraft 20 at slower speeds.

Figure 6:
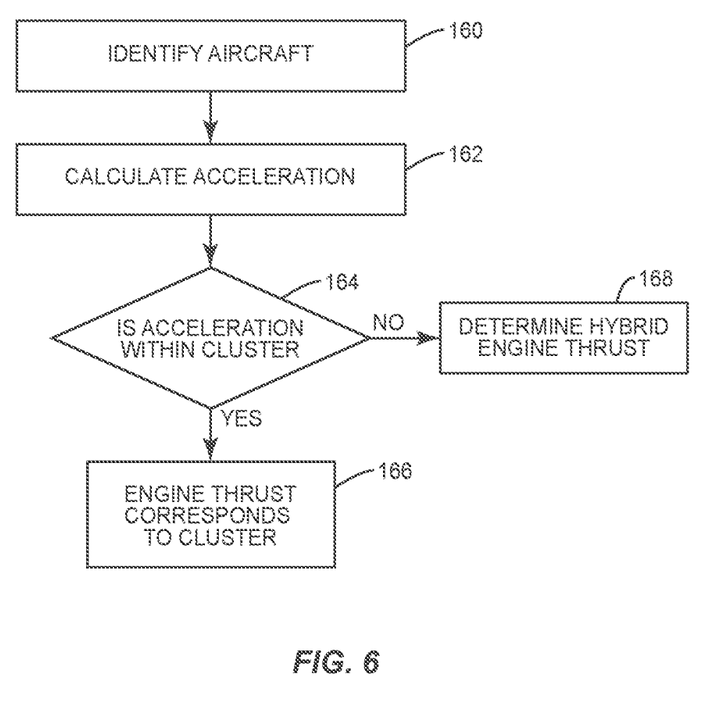
FIG. 6 is a flowchart diagram of a method of determining engine thrust of an aircraft during taxiing on an airport surface.

FIG. 6 illustrates functionality of the monitoring node 110 in determining the engine thrust of an aircraft 20. The monitoring node 110 identifies the aircraft (block 160) and calculates acceleration for the aircraft 20 over a time period while taxiing along the airport surface 101 (block 162). The monitoring node 110 compares the acceleration and time period with predetermined data for other similar taxiing aircraft 20. The comparison determines whether the acceleration data falls within one of the clusters 40 in the predetermined data (block 164). When the monitoring node 110 determines that the acceleration data fall within one of the clusters 40, the monitoring node 110 determines that the aircraft 20 is taxiing with corresponding thrust levels of the engines 21 (block 166). When the acceleration data do not correspond to one of the clusters 40, the monitoring node 110 determines that there is a different hybrid engine use (block 168). The different engine use can be caused by one or more factors including but not limited to differing amounts of fuel in the aircraft 20, different thrust levels from one or more of the engines 21, and weather conditions.

Figure 7:
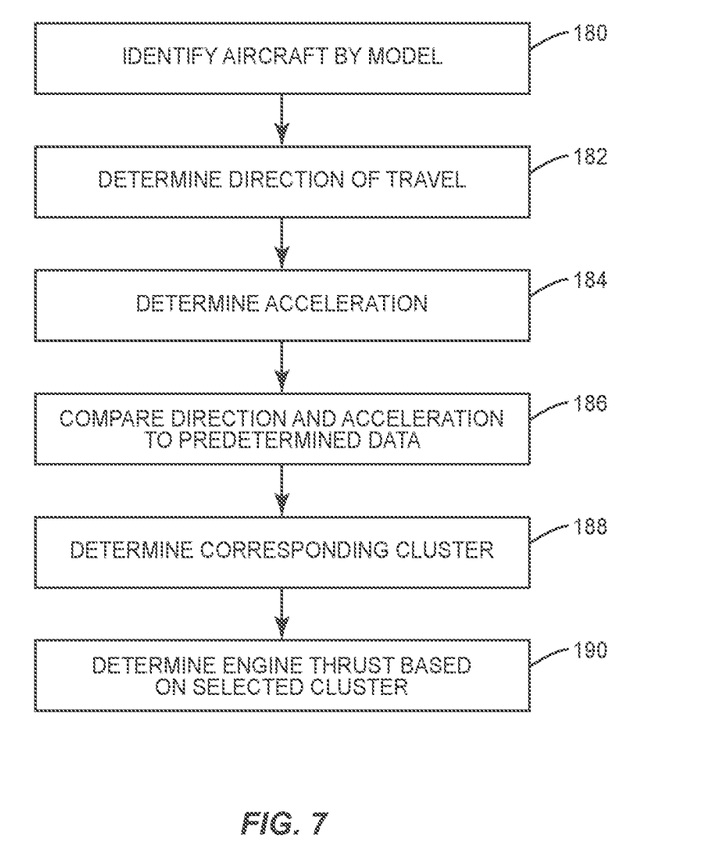
FIG. 7 is a flowchart diagram of a method of determining engine thrust of an aircraft during taxiing on an airport surface.

FIG. 7 illustrates functionality of the monitoring node 110 to determine an engine thrust of an aircraft 20. The monitoring node 110 identifies the aircraft 20 by model (block 180). The model provides the monitoring node 110 with the number of engines 21 on the aircraft 20 and can also include various other aspects, including but not limited to mass of the aircraft 20, total engine thrust, engine thrust levels for the engines 21, and acceleration ranges for the aircraft 20. The monitoring node 110 determines a direction of travel of the aircraft 20 (block 182). The direction of travel includes taxiing outward away from the gate 104 in preparation for takeoff and taxiing inward towards the gate 104 after landing. Outward taxiing includes the aircraft having a larger weight and mass as the aircraft 20 is fueled in preparation for the flight. Inward taxiing includes a smaller fuel load as a portion of the fuel has been consumed during the flight. Outward taxiing can be slower due to the weight of the extra fuel.

The monitoring node 110 determines an acceleration of the aircraft 20 (block 184). The acceleration includes the change in velocity of the aircraft 20 over a time period. In some examples, the acceleration is determined over a time period from when the aircraft 20 is initially stationary to a time in which the aircraft 20 has a given velocity. In some examples, the acceleration is determined only during the time period in which the aircraft 20 is accelerating.

The acceleration and time period are then compared to predetermined data for other aircraft 20 with the same model number and manufacturer and moving in the same direction (block 186). The predetermined data include one or more clusters 40 of data points 41 that each correspond to a different number of engines 21 providing the engine thrust. The data point 41 calculated for the acceleration and direction of the aircraft 20 is determined to fall within one of the clusters 40 (block 188). The thrust levels of the one or more engines 21 of the aircraft 20 is determined to be the same as that of the cluster 40 (block 190). The engine thrust information can include a total engine thrust of the aircraft 20. The engine thrust information can also include the thrust level for each of the engines 21 on the aircraft 20.

In the various examples, the order in which the methodology proceeds can vary. In some examples, the monitoring node 110 initially identifies the aircraft 20 prior to calculating the acceleration data. In other examples, the identification and calculation occur concurrently.

Figure 8:
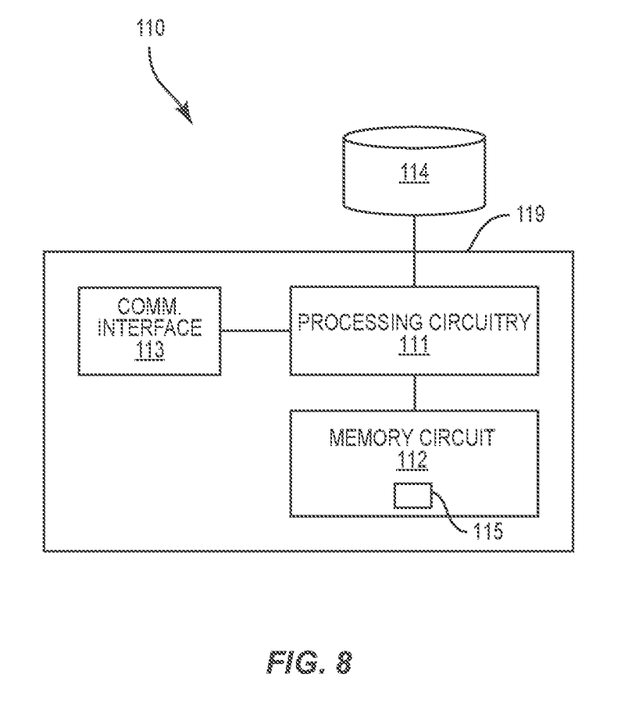
FIG. 8 is a schematic diagram of a monitoring node.

As illustrated in FIG. 8, the monitoring node 110 includes a computing device 119 with processing circuitry 111 that include one or more microprocessors, microcontrollers, Application Specific Integrated Circuits (ASICs), or the like, configured with appropriate software and/or firmware. A computer readable storage medium (shown as memory circuitry 112) stores data and computer readable program code 115 that configures the processing circuitry 111 to implement the techniques using algorithms and logic described above. Memory circuitry 112 is a non-transitory computer readable medium and can include various memory devices such as random access memory, read-only memory, and flash memory. Communications circuitry 113 connects the monitoring node 110 to one or more other entities 80 as will be explained below. The communications can be through one or more of a cellular network, satellite communication network, and a packet data network. The communications circuitry 113 can support a wired connection (e.g., Ethernet), a wireless connection, or both. A database 114 is stored in a non-transitory computer readable storage medium (e.g., an electronic, magnetic, optical, electromagnetic, or semiconductor system-based storage device). The database 114 can be local or remote relative to the monitoring node 110.

In some examples, the predetermined data are maintained in the memory circuitry 112 and/or the database 114. In other examples, the memory circuitry 112 is maintained remotely from the monitoring node 110 and accessed to calculate the engine thrust of a monitored aircraft 20.

Figure 9:
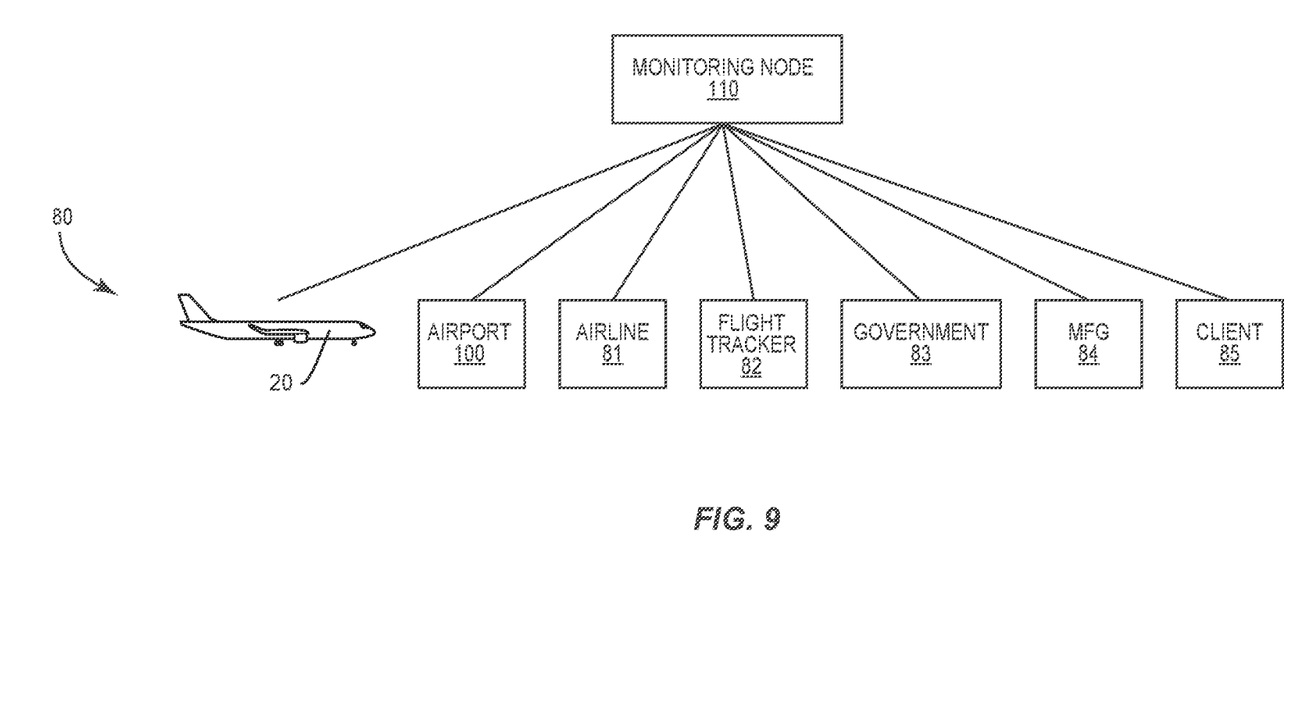
FIG. 9 is a diagram of entities that can communicate with a monitoring node.

The monitoring node 110 communicates with one or more entities 80. The communication can provide for one or more of the aspects about the movement of the aircraft 20 on the airport surface 101 and the predetermined data about similar aircraft 20. FIG. 9 illustrates examples of the different entities 80 that can communicate with the monitoring node 110. Entities 80 include but are not limited to: the aircraft 20 itself, the airport 100 (e.g., the control tower that is monitoring aircraft 20), an airline 81 (e.g., Delta Airlines, United Airlines) of which the aircraft 20 is part of a larger fleet, a flight tracker 82 (e.g., Flight Aware 24, Flight Radar, Inspire), a government entity 83 (e.g., Federal Aviation Administration (FAA)), and an aircraft manufacturer 84 (e.g., Boeing). One or more of these entities 80 can provide information about one or more aspects of the aircraft 20 such as but not limited to acceleration, velocity, time period of movement, direction of travel, and manufacturer and model number. The monitoring node 110 itself may also be positioned at the airport 100 to collect the needed data to calculate the engine thrust.

In some examples, the monitoring node 110 identifies the aircraft 20, the direction of travel, and movement data to calculate the acceleration including velocity and time period from one or more of the entities 80. In some examples, the data regarding movement of the aircraft 20 on the airport surface 101 is obtained by one or more flight trackers 82. The flight trackers 82 provide the locations of the aircraft 20 along the airport surface 101, velocity, direction of travel, and time periods of the aircraft 20 while taxiing along the airport surface 101. The flight trackers 82 can also provide the identity of the aircraft 20.

In some examples, the monitoring node 110 includes one or more personnel that monitor the incoming and outgoing flights and enters the information into the computing device 119. The data can include one or more of the identity of the aircraft 20 and the movement data to calculate the acceleration data.

Figure 10:
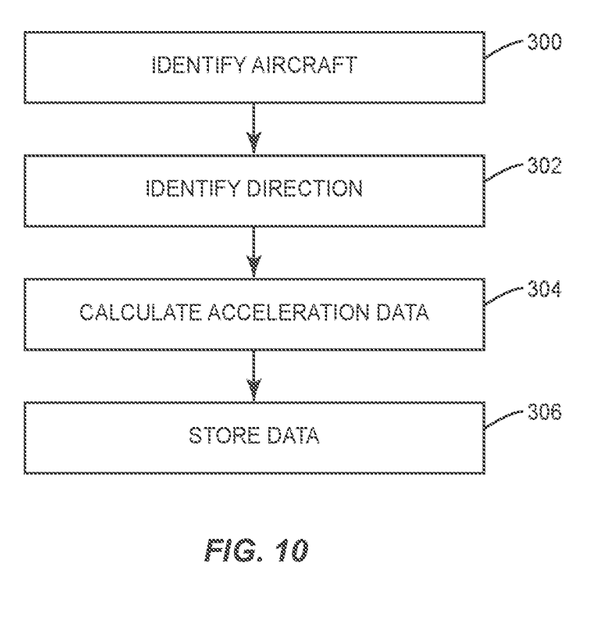
FIG. 10 is a flowchart diagram of a method of building a database of predetermined data corresponding to aircraft taxiing on an airport surface.

The data points 41 of the predetermined data can be established in different manners. One example is illustrated in FIG. 10 that includes the monitoring node 110 building the predetermined data. Initially the monitoring node 110 has no or little previous data of the movement of previous aircraft. To build these data, the monitoring node 110 identifies aircraft 20 moving on the airport surface (block 300) and a direction that the aircraft 20 are traveling (block 302). The monitoring node 110 calculates the acceleration of the aircraft 20 over a time period (block 304) and stores the data (block 306). The monitoring node 110 repeats the process to build the database of predetermined data. In some examples, the monitoring node 110 builds the database until obtaining a predetermined amount of data points have been calculated. Once this amount of data is obtained, the monitoring node 110 is able to calculate engine thrust for subsequently monitored aircraft 20.

In some examples, the monitoring node 110 builds the database exclusively from aircraft 20 taxiing at a particular airport 100. The monitoring node 110 maintains different groupings of data for aircraft 20 at different airports 100. In other examples, the monitoring node 110 combines data for aircraft from two or more different airports 100. The assumption with this collection method is that an aircraft 20 of the same model and manufacturer has the same acceleration at different airports 100.

In other examples, data points 41 can be obtained from the manufacturer 84 of the aircraft 20. These data can be from testing performed on the aircraft 20 and/or different testing algorithms and/or simulations run on the technical specifications of the aircraft 20. In other examples, the data are obtained from a flight tracker 82 that monitors aircraft 20 at numerous airports 100 around the world. In yet other examples, the data are built using a combination of two or more of these sources of data.

The acceleration data calculated by the monitoring node 110 can be supplied to one or more of the entities 80. In some examples, the interested entities 80 subscribe to the monitoring node 110 to have access to the data. The entities 80 can use their devices to access the monitoring node 110 through a network (e.g., Internet). In some examples, one or more of the entities 80 can use his or her respective device to access the monitoring node 110 through a separate portal. Each entity's portal can include a secure interface through which the entity 80 can access the information that is assigned to them. In some examples, the data are divided with the different data available to a limited number of the entities 80.

The entities 80 can access the data through the monitoring node 110. In some examples, the monitoring node 110 is configured for browser-based accessibility. The browser-based interface can support well-known browsers. Alternatively, or in conjunction the entities 80 can obtain the information using one or more APIs through their device. The browser-based interface can include a website through which the data can be accessible. Although the website can be hosted by the monitoring node 110, it can also be hosted at another location accessible through the network.

The monitoring methodology can be used on a variety of different aircraft 20. Aircraft 20 include but are not limited to manned aircraft, unmanned aircraft, manned spacecraft, unmanned spacecraft, manned rotorcraft, and unmanned rotorcraft, and combinations thereof.

By the term "substantially" with reference to amounts or measurement values, it is meant that the recited characteristic, parameter, or value need not be achieved exactly. Rather, deviations or variations, including, for example, tolerances, measurement error, measurement accuracy limitations, and other factors known to those skilled in the art, may occur in amounts that do not preclude the effect that the characteristic was intended to provide.

Further, the disclosure comprises examples according to the following clauses:

Clause 1. A computing device to determine engine thrust of an aircraft 20 during taxiing, the computing device comprising:
  memory circuitry 112 configured to store computer-readable program code 115; and
  processing circuitry 111 configured to execute the computer-readable program code 115 to cause the computing device to:
  identify an aircraft 20 on an airport surface 101;
  calculate an acceleration of the aircraft 20 during the taxiing of the aircraft 20;
  compare the acceleration with predetermined data from similar aircraft 20; and
  based on the comparison, determine an engine thrust for the aircraft 20 while the aircraft 20 is taxiing.

Clause 2. The computing device of Clause 1, wherein comparing the acceleration with the predetermined data from similar aircraft 20 comprises comparing the acceleration and the time period with acceleration data and time period data for other aircraft 20 each with a common manufacturer and model.

Clause 3. The computing device of either of Clauses 1 or 2, wherein the processing circuitry 111 is further configured to determine a number of engines 21 on the aircraft 20 based on identified model of the aircraft 20.

Clause 4. The computing device of Clause 3, wherein for each of the engines 21, the processing circuitry 111 is configured to determine whether each of the engines 21 is operating at a higher thrust level or a lower thrust level.

Clause 5. The computing device of Clause 4, wherein the lower thrust level is a zero thrust level.

Clause 6. The computing device of any of Clauses 1-5, wherein the processing circuitry 111 is configured to:
determine a starting point of the aircraft 20 on the airport surface 101 when the aircraft 20 is stationary;
determine an ending point that is positioned away from the starting point with the aircraft 20 moving along the airport surface 101 at the ending point; and
calculate the acceleration based on a change in velocity between the starting and ending points and the time period for the aircraft 20 to move between the starting and ending points.

Clause 7. The computing device of any of Clauses 1-6, wherein the processing circuitry 111 is configured to determine that the acceleration falls within a cluster 40 of data points 41 in the predetermined data and determine the engine thrust based on the cluster 40.

Clause 8. The computing device of any of Clauses 1-7, wherein the processing circuitry 111 is configured to determine a number of engines 21 and a thrust level of each of the engines 21.

Clause 9. The computing device of any of Clauses 1-8, wherein the predetermined data are stored at the monitoring node 110.

Clause 10. A computing device to determine engine thrust of an aircraft 20 during taxiing, the computing device comprising:
memory circuitry 112 configured to store computer-readable program code 115; and
processing circuitry 111 configured to execute the computer-readable program code 115 to cause the computing device to:
identify the aircraft 20 by model;
identify a direction of travel of the aircraft 20;
determine an acceleration of the aircraft 20 over a time period during taxiing of the aircraft 20;
compare the acceleration and the time period with predetermined data of other aircraft 20 of the same model and the same direction of travel;
determine that the acceleration and time period is within a cluster 40 of data points 41 in the predetermined data with the cluster 40 corresponding to an engine thrust for the aircraft 20; and
determine that the aircraft 20 is taxiing with a same number of engines 21 that are operating at same thrust levels as other aircraft from the corresponding cluster 40.

Clause 11. The computing device of Clause 10, wherein the processing circuitry 111 determines an engine thrust of the aircraft 20.

Clause 12. The computing device of either of Clauses 10 or 11, wherein the processing circuitry 111 calculates the acceleration between a first point where the aircraft 20 is stationary and a second point where the aircraft 20 is moving.

Clause 13. The computing device of Clause 12, wherein the processing circuitry 111 calculates the acceleration during the time period with a velocity of the aircraft 20 constantly increasing.

Clause 14. The computing device of any of Clauses 10-13, wherein the computing device is further configured to calculate the acceleration and the time period of the acceleration of the other aircraft and store the thrust levels as the data points in the predetermined data.

Clause 15. A method of calculating engine thrust of an aircraft 20 that is taxiing along an airport surface 101 of an airport 100, the method comprising:
identifying an aircraft 20 that is on an airport surface 101;
calculating an acceleration over a time period of the aircraft 20 taxiing along the airport surface 101;
comparing the acceleration and the time period to data points 41 from other ones of the same aircraft 20 that each had an acceleration over a time period during taxiing;
determining that the acceleration and the time period corresponds to a cluster 40 of the data points 41 with the cluster 40 corresponding to a number of engines 21 operating at one or more thrust levels; and
determining that the aircraft is taxiing with the same number of engines 21 and the same thrust levels as the cluster 40.

Clause 16. The method of Clause 15, wherein identifying the aircraft 20 comprises identifying a model of the aircraft 20 from records maintained at the airport.

Clause 17. The method of either of Clauses 15 or 16, wherein calculating the acceleration of the aircraft 20 comprises determining a change in velocity of the aircraft 20 between first and second points along the airport surface 101 relative to the time period for the aircraft 20 to move between the first and second points with the velocity of the aircraft 20 at the first point being zero.

Clause 18. The method of any of Clauses 15-17, further comprising obtaining the data points 41 from one or more remote entities 80 that monitor other aircraft.

Clause 19. The method of any of Clauses 15-18, further comprising that each of the one or more engines 21 on the aircraft 20 has a full thrust level or a zero thrust level.

Clause 20. The method of any of Clauses 15-19, further comprising obtaining the data points 41 from previous aircraft 20 while taxiing at the airport.

Clause A1. A method of determining engine thrust of an aircraft 20 during taxiing, the method comprising:
identifying an aircraft 20 on an airport surface 101;
calculating an acceleration of the aircraft 20 during the taxiing of the aircraft 20;
comparing the acceleration with predetermined data from similar aircraft 20; and
based on the comparison, determining an engine thrust for the aircraft 20 while the aircraft 20 is taxiing.

Clause A2. The method of Clause A1, wherein comparing the acceleration with the predetermined data from similar aircraft 20 comprises comparing the acceleration and the time period with acceleration data and time period data for other aircraft 20 each with a common manufacturer and model.

Clause A3. The method of either of Clauses A1 or A2, comprising determining a number of engines 21 on the aircraft 20 based on identified model of the aircraft 20.

Clause A4. The method of Clause A3, comprising for each of the engines 21, determining whether each of the engines 21 is operating at a higher thrust level or a lower thrust level.

Clause A5. The method of Clause A4, wherein the lower thrust level is a zero thrust level.

Clause A6. The method of any of Clauses A1-A5, comprising:
determining a starting point of the aircraft 20 on the airport surface 101 when the aircraft 20 is stationary;
determining an ending point that is positioned away from the starting point with the aircraft 20 moving along the airport surface 101 at the ending point; and calculating the acceleration based on a change in velocity between the starting and ending points and the time period for the aircraft 20 to move between the starting and ending points.

Clause A7. The method of any of Clauses A1-A6, comprising determining that the acceleration falls within a cluster 40 of data points 41 in the predetermined data and determine the engine thrust based on the cluster 40.

Clause A8. The method of any of Clauses A1-A7, comprising determining a number of engines 21 and a thrust level of each of the engines 21.

Clause A9. The method of any of Clauses A1-A8, wherein the predetermined data are stored at the monitoring node 110.

Clause A10. A method of determining engine thrust of an aircraft 20 during taxiing, the method comprising:
identifying the aircraft 20 by model;
identifying a direction of travel of the aircraft 20;
determining an acceleration of the aircraft 20 over a time period during taxiing of the aircraft 20;
comparing the acceleration and the time period with predetermined data of other aircraft 20 of the same model and the same direction of travel;
determining that the acceleration and time period is within a cluster 40 of data points 41 in the predetermined data with the cluster 40 corresponding to an engine thrust for the aircraft 20; and
determining that the aircraft 20 is taxiing with a same number of engines 21 that are operating at same thrust levels as other aircraft from the corresponding cluster 40.

Clause A11. The method of Clause A10, comprising determining an engine thrust of the aircraft 20.

Clause A12. The method of either of Clauses A10 or A11, comprising calculating the acceleration between a first point where the aircraft 20 is stationary and a second point where the aircraft 20 is moving.

Clause A13. The method of Clause A12, comprising calculating the acceleration during the time period with a velocity of the aircraft 20 constantly increasing.

Clause A14. The method of any of Clauses A10-13, comprising calculating the acceleration and the time period of the acceleration of the other aircraft and store the thrust levels as the data points in the predetermined data.

Clause A15. A method of calculating engine thrust of an aircraft 20 that is taxiing along an airport surface 101 of an airport 100, the method comprising:
identifying an aircraft 20 that is on an airport surface 101;
calculating an acceleration over a time period of the aircraft 20 taxiing along the airport surface 101;
comparing the acceleration and the time period to data points 41 from other ones of the same aircraft 20 that each had an acceleration over a time period during taxiing;
determining that the acceleration and the time period corresponds to a cluster 40 of the data points 41 with the cluster 40 corresponding to a number of engines 21 operating at one or more thrust levels; and
determining that the aircraft is taxiing with the same number of engines 21 and the same thrust levels as the cluster 40.

Clause A16. The method of Clause A15, wherein identifying the aircraft 20 comprises identifying a model of the aircraft 20 from records maintained at the airport.

Clause A17. The method of either of Clauses A15 or A16, wherein calculating the acceleration of the aircraft 20 comprises determining a change in velocity of the aircraft 20 between first and second points along the airport surface 101 relative to the time period for the aircraft 20 to move between the first and second points with the velocity of the aircraft 20 at the first point being zero.

Clause A18. The method of any of Clauses A15-A17, further comprising obtaining the data points 41 from one or more remote entities 80 that monitor other aircraft.

Clause A19. The method of any of Clauses A15-A18, further comprising that each of the one or more engines 21 on the aircraft 20 has a full thrust level or a zero thrust level.

Clause A20. The method of any of Clauses A15-A19, further comprising obtaining the data points 41 from previous aircraft 20 while taxiing at the airport.

Clause A21. A computer program comprising computer program instructions that, when executed by computer processing circuitry 111, cause the computer processing circuitry 111 to perform the method of any of Clauses A1-A20.

Clause A22. A computer-readable storage medium having stored therein the computer program of Clause A21.

Clause A23. A computing device for determining engine thrust of an aircraft 20 during taxiing, the computing device comprising:
memory circuitry 112 configured to store the computer program of Clause A21; and
computer processing circuitry 111 configured to execute the computer program thereby causing the computer processing circuitry 111 to perform the method of any of Clauses A1-A20.

The invention claimed is:

1. A method of determining engine thrust of an aircraft during taxiing, the aircraft comprising a number of engines, the method comprising:
identifying an aircraft on an airport surface;
calculating an acceleration of the aircraft during the taxiing of the aircraft;
comparing the acceleration of the aircraft to acceleration data of other aircraft with an equal number of engines, the acceleration data comprising clusters of data points with a number of clusters being the same as the number of engines and with each of the clusters of data points corresponding to a different engine thrust;
determining that the acceleration of the aircraft is aligned within one of the cluster of data points;
determining an engine thrust for the aircraft based on the cluster in which the acceleration coincides.

2. The method of claim 1, wherein the comparing the acceleration with the acceleration data from similar aircraft comprises comparing the acceleration and a time period during taxiing of the aircraft with acceleration data and time period data for other aircraft each with a common manufacturer and model.

3. The method of claim 1, comprising determining the number of engines on the aircraft based on an identified model of the aircraft.

4. The method of claim 3, comprising identifying a model of the aircraft from records maintained at the airport.

5. The method of claim 3, wherein for each of the engines, determining whether each of the engines is operating at a higher thrust level or a lower thrust level.

6. The method of claim 5, wherein the lower thrust level is a zero thrust level.

7. The method of claim 1, further comprising:
determining a starting point of the aircraft on the airport surface when the aircraft is stationary;
determining an ending point that is positioned away from the starting point with the aircraft moving along the airport surface at the ending point; and calculating the acceleration based on a change in velocity between the starting and ending points and a time period for the aircraft to move between the starting and ending points.

8. The method of claim 1, comprising determining the number of engines and a thrust level of each of the engines.

9. The method of claim 1, wherein the acceleration data are stored at a monitoring node.

10. The method of claim 9, wherein the monitoring node is selected from the group consistently essential of a control tower of an airport that monitors the overall operation of the airport, an airline that schedules the arrival and departure of aircraft, a flight tracker that monitors the status of flights, and a governmental unit.

11. A computer program product comprising a non-transitory computer-readable medium having computer-executable program code instructions that, when executed by a computing device, cause the computing device to:
 identify an aircraft on an airport surface and determine a number of engines on the aircraft;
 calculate an acceleration of the aircraft during the taxiing of the aircraft;
 compare the acceleration with predetermined data from similar aircraft with an equal number of engines, the data comprising clusters of data points with each of the clusters corresponding to a different engine thrust;
 determine that the acceleration of the aircraft corresponds to one of the clusters of data points; and
 based on the comparison, determine the engine thrust for the aircraft while the aircraft is taxiing.

12. The computer program product of claim 11, wherein the computing device is further configured to
 determine that the aircraft is taxiing with the same number of engines and the same thrust levels as the cluster.

13. The computer program product of claim 11, wherein the computing device is further configured to identify a model of the aircraft from records maintained at an airport.

14. The computer program product of claim 11, wherein the calculating the acceleration of the aircraft comprises determining a change in velocity of the aircraft between first and second points along the airport surface relative to a time period for the aircraft to move between the first and second points with a velocity of the aircraft at the first point being zero.

15. The computer program product of claim 11, wherein the computing device is further configured to obtain the data points from one or more remote entities that monitor other aircraft.

16. A computing device for determining engine thrust of an aircraft during taxiing, the computing device comprising:
 memory circuitry configured to store computer-readable program code; and
 processing circuitry configured to execute the computer-readable program code to cause the computing device to:
  identify the aircraft by model and a number of engines of the aircraft;
  identify a direction of travel of the aircraft;
  determine an acceleration of the aircraft over a time period during taxiing of the aircraft;
  compare the acceleration and the time period with predetermined data of other aircraft of the same model, the same direction of travel, and with the same number of engines and with the other aircraft having an acceleration over a time period during taxiing;
  determine that the acceleration and time period is within a cluster of data points in the predetermined data with the cluster corresponding to an engine thrust for the aircraft; and
  determine that the aircraft is taxiing with a same number of engines that are operating at same thrust levels as other aircraft from the corresponding cluster.

17. The computing device of claim 16, wherein the processing circuitry calculates the acceleration between a first point where the aircraft is stationary and a second point where the aircraft is moving.

18. The computing device of claim 17, wherein the processing circuitry calculates the acceleration during the time period with a velocity of the aircraft constantly increasing.

19. The computer program product of claim 11, wherein the computing device is further configured to determine whether the engines on the aircraft are operating at a high thrust level or a low thrust level.

20. The computer program product of claim 19, wherein the computing device is further configured to determine whether the engines are at a zero-thrust level.

* * * * *